United States Patent
Reid

(10) Patent No.: US 9,098,265 B2
(45) Date of Patent: Aug. 4, 2015

(54) CONTROLLING AN ORDER FOR PROCESSING DATA ELEMENTS DURING VECTOR PROCESSING

(75) Inventor: Alastair David Reid, Fulbourn (GB)

(73) Assignee: ARM Limited, Cambridge (GB)

( * ) Notice: Subject to any disclaimer, the term of this patent is extended or adjusted under 35 U.S.C. 154(b) by 523 days.

(21) Appl. No.: 13/546,227

(22) Filed: Jul. 11, 2012

(65) Prior Publication Data

US 2014/0019728 A1    Jan. 16, 2014

(51) Int. Cl.
*G06F 9/38* (2006.01)
*G06F 9/445* (2006.01)
*G06F 9/30* (2006.01)

(52) U.S. Cl.
CPC ........ *G06F 9/30036* (2013.01); *G06F 9/30018* (2013.01); *G06F 9/384* (2013.01); *G06F 9/3838* (2013.01); *G06F 9/4451* (2013.01)

(58) Field of Classification Search
None
See application file for complete search history.

(56) References Cited

U.S. PATENT DOCUMENTS

2006/0155964 A1   7/2006   Totsuka
2009/0037697 A1 *  2/2009   Ramani et al. ................. 712/214
2010/0042789 A1   2/2010   Gonion et al.
2010/0287550 A1   11/2010  Eichenberger et al.
2011/0161642 A1   6/2011   Eichenberger et al.

OTHER PUBLICATIONS

Partial International Search Report dated Nov. 26, 2013 in PCT/GB2013/051530.
International Search Report and Written Opinion of the International Searching Authority mailed Feb. 13, 2014 in PCT/GB2013/051530.

* cited by examiner

*Primary Examiner* — Scott Sun
(74) *Attorney, Agent, or Firm* — Nixon & Vanderhye P.C.

(57) ABSTRACT

A data processing apparatus includes a register bank having a plurality of registers for storing vectors being processed; a pipelined processor for processing the stream of vector instructions; the pipelined processor comprising circuitry configured to detect data dependencies for the vectors processed by the stream of vector instructions and stored in the plurality of registers and to determine constraints on timing of execution for the vector instructions such that no register data hazards arise. Register data hazards arise where two accesses to a same register, at least one of said accesses being a write, occur in an order different to an order of said instruction stream such that an access occurring later in said instruction stream starts before an access occurring earlier in said instruction stream has completed. The pipelined processor includes data element hazard determination circuitry.

21 Claims, 8 Drawing Sheets

|  |  | state machine 17 | state machine 19 |
|---|---|---|---|
|  |  | UN | UN |
| VPCLR |  | UN |  |
| iVP == [0...0] |  | UN |  |
| VPNXT V5 |  |  | VPfirst |
| iVP == [0...2] |  |  |  |
| VADD V0, V1, V2 | ✓ ✓ ✓ ? ? ? | WC | UN |
| VPNXT V5 |  | WP (can optimize) |  |
| iVP == [3...5] |  |  |  |
| VSUB V0, V4, V6 | ✓ ✓ ✓ ✓ ✓ ✓ ? ? | WC |  |

FIG. 7

Vset_first    $V_0, R_0, \#0$
Vset_partial  $V_0, R_1, \#1$
.
.
.
Vset_partial  $V_0, R_6, \#6$
Vset_last     $V_0, R_7, \#7$

FIG. 11

CONTROLLING AN ORDER FOR PROCESSING DATA ELEMENTS DURING VECTOR PROCESSING

FIELD OF THE INVENTION

The present invention relates to the field of data processing and in particular to the processing of vector operations.

DESCRIPTION OF THE PRIOR ART

Vector processing involves the processing of a vector which comprises many data elements. Operations may be performed on all or on selected data elements within the vector, these operations being performed at a same time in parallel with each other. Different elements may be selected by partitioning the vector into partitions of one or more elements and then selecting the partitions for processing by a particular operation. Alternatively masks can be used that select some elements within a vector and do not select other elements for processing by the operation.

Vector partitioning and the processing of the partitioned data can improve performance, by allowing operations to be performed in parallel, however, it has the potential to introduce significant data hazards. These must be avoided and ensuring data consistency and coherency of these operations while allowing the parallel processing of the data can be very expensive in additional hardware, latency and power.

It would be desirable to be able to reduce the costs of coherency and consistency operations when processing vectors, while still benefiting from the improved performance associated with parallel processing.

SUMMARY OF THE INVENTION

A first aspect of the present invention provides a data processing apparatus for processing a stream of vector instructions for performing operations on vectors, said vectors each comprising a plurality of data elements, said data processing apparatus comprising:

a register bank comprising a plurality of registers for storing said vectors being processed;

a pipelined processor for processing said stream of vector instructions;

said pipelined processor comprising circuitry configured to detect data dependencies for said vectors processed by said stream of vector instructions and stored in said plurality of registers and to determine constraints on timing of execution for said vector instructions such that no register data hazards arise, said register data hazards arising where two accesses to a same register, at least one of said accesses being a write, occur in an order different to an order of said instruction stream such that an access occurring later in said instruction stream starts before an access occurring earlier in said instruction stream has completed;

said pipelined processor comprising data element hazard determination circuitry configured to determine for at least some of said data elements within vectors where data dependencies have been identified, whether said data dependencies identified for said vectors exist for each of said at least some of said data elements, and if not to relax said determined constraints on timing of execution for an instruction processing said data element.

The present invention recognises that partitioned vector operations provide the potential for many data hazards. Handling these correctly can incur a significant cost. The present invention also recognises that in typical usage patterns, although these data hazards may exist between vectors, if one were to consider the hazards as hazards between individual data elements within the vectors, many of these hazards may disappear. Recognising this enables some of the timing constraints that are generated when considering the vectors and that ensure that where optimizations are made they are safe and do not corrupt the data within the vectors to be relaxed. Thus, the present invention determines data hazards between at least some of the data elements within the vectors and relaxes the timing constraints required to ensure data consistency between vectors where they are not required for actual data element consistency. In this regard, relaxing the determined constraints on timing may mean that rather than requiring that certain operations are performed one after the other, they may be allowed to overlap with each other, or they may be allowed to be performed in a different order.

As noted above a data hazard occurs where two accesses to a same register, at least one of said accesses being a write, occur in an order different to an order of said instruction stream. In this regard accesses are considered to occur in an order different to the order of the instruction stream even in the case where a later access in the instruction stream starts before an earlier access completes even if the later access completes later than the earlier access, starting before the earlier access has completed may lead to a data hazard in that the wrong data may be accessed.

In some embodiments, said data processing apparatus is configured to access data elements within a vector in a predetermined accessing order and said data element hazard determination circuitry is configured to determine, that when at least one data element is to be updated within a vector in response to a vector instruction subsequent data elements in said predetermined accessing order within said vector currently contain values that may be modified and can be discarded, and to signal to execution circuitry that at least one operation in response to at least one further vector instruction to update at least one of said subsequent data elements can be performed in any order with respect to said operation to update said data element.

Embodiments of the present invention recognise that the code that is used to update registers generally does so in a particular order, such that in many cases a first data element is updated followed by a subsequent data element and so on. Thus, even where different vector operations are being performed they may be being performed on the same vector and the first operation might fill the first three data elements while the next operation might fill the next three. With this in mind, the data processing apparatus is configured to detect the updating of a data element and then to recognise that the values stored in the subsequent data elements within the vector will be updated later and thus, will not be required later and can be discarded. Recognising this enables vector operations that are to overwrite these values to be performed immediately without waiting for the updating of the preceding data elements. Thus, subsequent operations that update a particular vector can be performed in parallel with each other at a same time as each other or in a different order to the order of the instruction stream.

In some embodiments, said vector is divided into partitions, each partition comprising at least one data element, where partitions comprise multiple data elements said multiple data elements are neighbouring data elements, said data processing apparatus being configured to access said partitions within a vector in a predetermined accessing order.

Although vector operations may operate on single data elements, in some embodiments the vector is partitioned and each operation operates on a particular partition. A partition may contain a single data element or it may contain multiple neighbouring data elements.

In some embodiments, said data element hazard determining circuitry comprises a state machine, said state machine indicating a state of values stored by data elements within a vector as said vector is accessed by an instruction, said state indicating whether said data elements are storing data values that are to be preserved or data values that can be discarded.

One way of determining data element hazards is by using a state machine that indicates the state of the values stored within the data elements of a vector at the time that the vector is accessed by an instruction. In this regard, it determines what the state will be at this point ahead of the actual access being made. By doing it in advance of the access the information that is gleaned can be used to affect the timing of other operations and allows optimizations to be performed. The state indicates whether the data elements that are stored need to be preserved or can be discarded. It does this using the accessing order constraints to determine which elements in a vector are still to be accessed and therefore can be discarded, while those that have already been updated need to be preserved.

In some embodiments said circuitry configured to detect data dependencies for said vectors processed by said stream of vector instructions is responsive to annotations associated with said vector instructions indicating no data dependencies when determining said data dependencies.

Embodiments of the invention provide instructions that have annotations associated with them that indicate for instructions where data dependencies might be anticipated that there are in fact no data dependencies. In such a case constraints on the scheduling of the execution of the instructions that relate to the anticipated data dependencies can be relaxed. In this regard there are instructions that update individual elements within a vector and although on the face of it subsequent instructions to update a same vector should be executed in order, if they each update different individual elements then this is not required and annotations within the instruction can indicate this and the timing constraints can be relaxed.

In some embodiments, said state machine comprises three states, an unknown state which indicates that all data elements comprise data values that are to be preserved, an access current state indicating that all data elements subsequent to said current partition currently being accessed by said vector instruction can be discarded and all other data elements are to be preserved, and an accessed by previous partition state that indicates that all data elements within said current partition and all subsequent data elements can be discarded and all previous data elements have data values that are to be preserved.

Although the state machine may comprise a number of states, three states may be sufficient in some embodiments to provide the required information. There may be an unknown state and for safety's sake in the unknown state all data elements are marked as should be preserved. This prevents these elements being overwritten in cases where this would not be acceptable. There is then an access current state which occurs when the instruction is accessing that particular element or partition within the vector and at this point one knows that all data elements subsequent to the current element or partition can be discarded and all other data elements need to be preserved as these have been or are being updated. There is a further state which is an access by previous partition state that indicates that one the next partition is to be updated but is not updated it yet. Thus, all data elements within this new current partition and all subsequent data elements can be discarded while all previous data elements have data values that are to be preserved. These states are useful in determining optimizations. In the unknown states no optimizations are possible. While in the previous partition state vector operations on the current partition and vector operations on a previous partition can be performed in any order and thus, any timing constraints that required the operation on the previous partition to be performed first can be relaxed.

In some embodiments, said data processing apparatus comprises a plurality of vector control registers for controlling which of said partitions said instruction is to operate on and a store for storing a value indicating which one of said plurality of vector control registers is indicating a current partition, wherein in response to detecting from said stored value that one of said vector control registers that indicates a next partition is different to said vector control register that indicated said previous partition, said state machine is switched to an unknown state.

It may be that there is more than one vector control register that can control which partition is to be accessed. This presents its own problems and in such a case, a data store is required to store a value indicative of the vector control register that indicates a current partition. In this way if a next partition of a register is accessed under control of a different vector control register, then one can determine this from the data value stored and the values in the state machine will no longer be relevant for the new vector control register and thus, the state should be set to unknown.

In some embodiments, said data processing apparatus further comprises register renaming circuitry for mapping registers identified by register identifiers within said vector instruction with one of said plurality of registers within said register bank; wherein in response to said data element hazard determination circuitry determining that at least one data element is to be updated within a vector in response to a vector instruction and that subsequent data elements in said predetermined accessing order within said vector currently contain values that may be modified and can be discarded, said pipelined processor is configured to update said register currently mapped to said register identified by said register identifier within said vector instruction.

Where a data processing apparatus has register renaming circuitry then when updating a register using a vector operation, a new register will need to be renamed for this vector operation as individual elements are updated at different times, and the data from the previously renamed register will need to be merged into this register when the operations are performed. This is a very costly operation. Embodiments of the present invention recognise that the determination that certain data elements can be discarded mean that the values stored in previously remapped registers may not in fact be required and thus, there is no point in merging them and the values can simply be overwritten with the new values. This results in considerable savings.

Thus, it may be that when updating subsequent data elements in response to a vector operation the physical register currently mapped by the renaming circuitry can simply be written to and no further renaming or copying of data is required. In effect one suppresses register renaming for these operations and saves considerable time and power.

In some embodiments, said pipelined processor comprises additional circuitry for determining when a first data element of a vector in an order of access is to be updated and for transmitting a signal indicating that said vector can be written to any currently unused register.

If one were to provide the data processing apparatus with additional circuitry which determines when a first data element of a vector is to be updated then where register renaming is present one can write this first value to a new register and rename this new register. The previously mapped register can then be discarded when the values within it have been accessed. This may improves timing constraints as the values stored in the previously mapped register are not overwritten by the new process and the register will be de-allocated when these values have been finished with the usual fashion. Thus, the new write does not need to wait for the other values to have been used. In effect embodiments of the invention trigger renaming for a first data element update and suppress it for subsequent updates.

In some embodiments, said additional circuitry comprises a state machine having a first state indicating an unknown state and at least one further state indicating a first element of said vector to be accessed is to be updated.

In order to determine when the first element is being updated an additional state machine can be used that has at least two states, one being a first unknown state and the other being a state indicating that the first element of the vector is to be accessed. In some embodiments it might have further states depending on the implementation.

In some embodiments, said data processing apparatus further comprises a data store for storing indicators that provide an indication for each data element within a vector indicating whether said data element is currently storing a data value that should be preserved or a data value that can be discarded, said element data hazard determination circuitry being configured to update said indicator store.

It may be advantageous in some cases to keep a record of which data elements are to be preserved and which can be discarded. This record may be kept in the register renaming circuitry, where there is register renaming, or it may be kept in association with the vector register where there is not. The indication may be in the form of an indicator for each data element indicating either valid or not valid data is stored i.e. can be preserved or can be discarded or it may be done in another form such as elements up to element three should be preserved and those beyond element 3 can be discarded.

In some embodiments, said data processing apparatus is configured in response to an instruction to store a vector to memory, to store a predetermined value in place of a value currently stored in said data element for each data element within a partition that is marked as storing a data value that can be discarded.

Storing an indication of the validity or otherwise of the data may be useful in cases such as when the vector is read. In this case rather than reading the values than can be discarded from the register one can simply read a predetermined value such as a 0 or a 1. This avoids these data values that are not required being read from the registers and this may be important where security is an issue and data values that are not currently being required should not be output in case they contain sensitive information.

In some embodiments, said pipelined processor comprises issue circuitry and execution circuitry for issuing and executing said vector instructions, said issue circuitry comprising said data element hazard detection circuitry.

The pipelined processor may comprise issue circuitry and execution circuitry. The issue circuitry is at the front end of the processor and performs the fetching of instructions the decoding and the data dependency checks. Performing these data dependency checks early in the pipeline means that potential optimizations are determined early in the procedure and this allows more optimizations to be performed.

In some embodiments, said data processing apparatus comprises synchronising circuitry, said synchronising circuitry being configured to periodically determine a state of data elements currently being processed by said execution circuitry and to transmit said state information to said issue circuitry.

In some embodiments, the data processing apparatus may comprise synchronising circuitry that can be used to periodically determine a state of data elements currently being processed and to send this information back to the issue circuitry. It may be that the state machine does not correctly follow the state of the data for some reason and it cannot regain the information easily. If this occurs for a long length of code then the potential optimizations will not be possible. Thus, it may be advantageous to have synchronising circuitry which either activates periodically or activates in response to certain events that are likely to cause synchronisation errors or activates in response to detecting that no optimizations have been performed recently. This synchronisation circuitry detects the state of the elements from the execution circuitry and feeds this back to the issue circuitry which resets the state machine and allows the optimizations to continue.

In some embodiments, said vectors comprise vector masks configured to identify data elements to be operated on by a vector operation, said data element hazard determination circuitry being configured to determine from said vector masks whether said data dependencies identified for said vectors exist for each of said at least some of said data elements, and if not to relax said determined constraints on timing of execution for an instruction processing said data element.

There may be vector masks that identify data elements to be operated on by a vector operation and data elements not to be operated on. In such a case, the data element hazard detection circuitry may be able to determine from these masks where data dependencies that were identified for the vectors will not occur due to only a portion of the data elements within the vector being operated. Thus, by analysing these masks it may be able to relax some of the timings.

In some embodiments, said vectors comprise vector masks configured to identify data elements within vector partitions to be operated on by a vector operation, said data processing apparatus being configured to perform one operation on a vector partition under control of a vector mask and a further operation on said vector partition under control of an inverse of said vector mask, said state machine comprising at least one further state comprising a masked access current state indicating that all data elements subsequent to said current partition currently being accessed by said vector instruction and said masked data elements within said data partition can be discarded, and all other data elements are to be preserved.

One example of where data dependencies can be relaxed is where vector masks are used within partitioned vectors to select a subset of the partition with the inverse of the mask selecting the other subset. In such a case a state machine similar to that with three states used for partitioned vectors can be used but with some additional states, these additional states indicating which portions of the partition that is controlled by the mask can be discarded and which parts needs to be preserved. In this way the ordering of operations can be determined by knowing which data can be overwritten.

A second aspect of the present invention provides a method of processing a stream of vector instructions for performing operations on vectors within a data processing apparatus, said vectors each comprising a plurality of data elements and being stored in registers within said data processing apparatus, said method comprising:

detecting data dependencies for said vectors processed by said stream of vector instructions and stored in said plurality of registers to determine constraints on timing of execution for said vector instructions such that no register data hazards arise, said register data hazards arising where two accesses to a same register, at least one of said accesses being a write, occur in an order different to an order of said instruction stream such that an access occurring later in said instruction stream starts before an access occurring earlier in said instruction stream has completed;

determining for at least some of said data elements within vectors where data dependencies have been identified, whether said data dependencies identified for said vectors exist for each of said at least some of said data elements, and if not:

relaxing said determined constraints on timing of execution for an instruction processing said data element.

A third aspect of the present invention provides a method of transforming a computer program, said computer program comprising a plurality of vector instructions for performing operations on vectors, said vectors each comprising a plurality of data elements, said method of compiling comprising:

analysing said plurality of vector instructions;

detecting data dependencies for said vectors to be processed by said plurality of vector instructions to determine constraints on timing of execution for said vector instructions such that no register data hazards arise, said register data hazards arising where two accesses to a same register, at least one of said accesses being a write, occur in an order different to an order of said instruction stream such that an access occurring later in said instruction stream starts before an access occurring earlier in said instruction stream has completed;

determining for at least some of said data elements within said vectors where data dependencies have been identified, whether said data dependencies identified for said vectors exist for each of said at least some of said data elements, and if not:

relaxing said determined constraints on timing of execution for an instruction processing said data element;

transforming said computer program into code suitable for execution on a data processing system.

A fourth aspect of the present invention provides a computer program which when executed on a computer will control said computer to perform steps of a method according to a third aspect of the present invention.

BRIEF DESCRIPTION OF THE DRAWINGS

The present invention will be described further, by way of example only, with reference to embodiments thereof as illustrated in the accompanying drawings, in which:

FIG. 7 shows example code and corresponding states of the state machines;

FIG. 11 shows an example of annotated instructions

DESCRIPTION OF EMBODIMENTS

Figure 1:
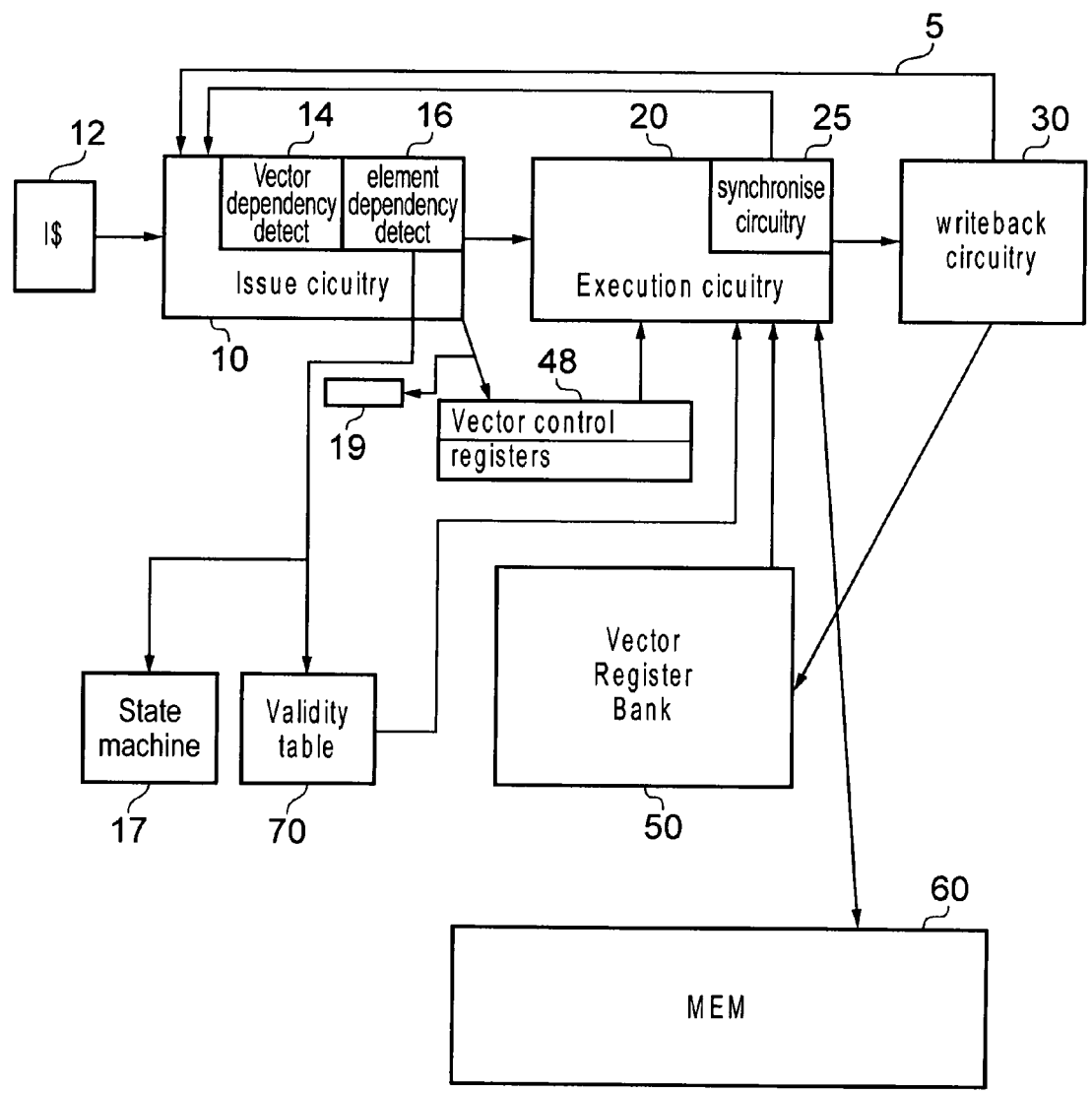
FIG. 1 schematically shows a data processing apparatus according to an embodiment of the present invention.

FIG. 1 schematically shows a data processing apparatus according to an embodiment of the present invention. This data processing apparatus is shown very schematically and it will be clear to a skilled person that there may be further interconnections between the circuitry and indeed further circuitry present. In the data processing apparatus shown there is a pipelined processor which comprises issue circuitry 10, execution circuitry 20 and writeback circuitry 30. Issue circuitry 10 retrieves instructions from an instruction cache 12 and decodes these instructions, it also detects data dependencies that arise due to the processing of the vectors and issues the decoded instructions to the execution circuitry.

Thus, issue circuitry 10 has vector data dependency circuitry 14 which determines data dependencies between the vectors and which receives information from the writeback circuitry 30 which enables it to know when various operations have completed. It also comprises data element dependency detection circuitry 16 which detects data dependencies between individual elements and determines where timing constraints imposed by the vector data dependency detection circuitry 14 can in fact be relaxed as although the operations might cause data dependencies between the vectors owing to the way the data elements are themselves accessed, these data dependencies will not actually arise and thus, vector operations that appear from the vector data dependencies to need to be executed in a certain order can in fact be executed in a different order. This data element dependency detection circuitry 16 is responsive to annotations associated with the instructions that indicate where timing constraints can be relaxed (see FIG. 11).

Figure 6:
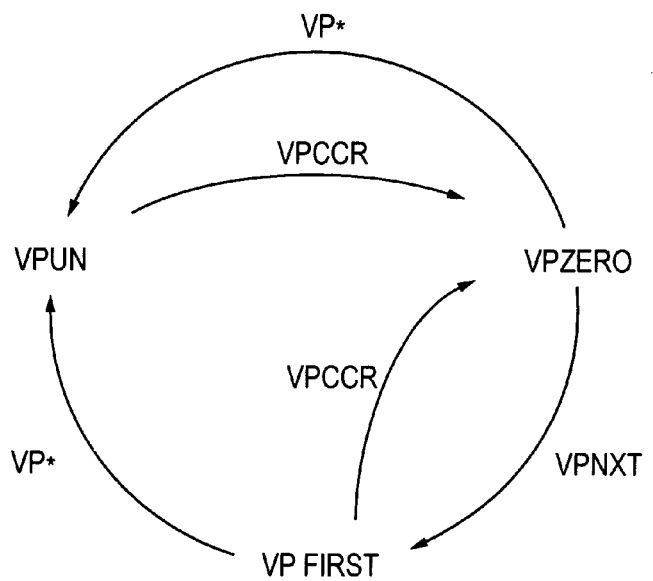
FIG. 6 schematically shows a state machine for determining when to perform register renaming according to an embodiment of the present invention.

Data processing apparatus 5 also comprises vector control registers 40 and a vector register bank 50. There is also a memory 60 for storing data. The vector register bank 50 comprises vectors that have a plurality of data elements that the execution circuitry 20 performs operations on under control of the vector instructions retrieved from instruction cache 12. Each vector operation may be performed on zero, one or more data elements within the vectors. The vector control registers 40 will control which data elements the vector operation is to be performed upon. These vector control registers 40 may take the form of masks which indicate which elements are to be operated on by the current operation or they may be in the form of vector partition registers which indicate which partition of the vector is to be operated on. In the latter case a vector may be partitioned into a number of partitions, each of these is described later. Each partition may comprise one or more data elements, these data elements being neighbouring elements. The vector control registers have a state machine 19 associated with them that is used to track the first data element that is to be updated and can be used to determine where register renaming is appropriate and where not this will be described with respect to FIGS. 4 and 6.

In some embodiments the partitioning may be controlled by more than one vector control register and in such a case it is not sufficient to track changes to the vector control register for a particular vector operation, it is necessary to track changes to all of the vector control registers and for each vector register it is necessary to track which vector control register was used by the last partitioned vector operation on that register. In order to track this a data store that stores a value that indicates the last vector control register that was used for a write to a particular register may be used. Thus, in response to a write to a particular register under control of a certain vector control register the data store is checked to determine if this is the vector control register that controlled the previous write to this register, if it is then the current value in the state machine can be checked, if not then the state machine for that register needs to go to unknown.

There is also a validity table 70 and a state machine 17 associated with vector register bank 50, the validity table 70 indicates which data elements within the registers are valid and need to be preserved and which can be discarded, while the state machine 17 indicates which partitions relative to the current partition are being operated on and which store data that needs to be preserved and which store data that can be discarded. Further details of this state machine are provided in the description of FIGS. 4 and 5. Information for the validity table 70 and state machine 17 is provided by the data element dependency detection circuitry 16 when analysing the instructions accessing these data elements and the pattern of access. This information can be used when a vector is read such that where the data elements are indicated as being invalid indicating that they can be discarded when they are read one can simply use a predetermined value rather than the actual value stored that is in any case invalid. This can save power and can also prevent the output of such data, which although no longer valid may contain a previously stored sensitive value. Thus, this can protect the security of the data.

It is important that the element data dependency circuitry only needs to monitor the instruction stream because this allows instruction decode/issue to proceed independently of execution and therefore avoids introducing stalls. However, this introduces some approximations which may mean that optimizations are not performed even when they are safe. It should be noted that these approximations never causes incorrect behaviour.

In particular, information about the state is likely to happen when VP (vector partition) or vector registers are saved to and then restored from the stack. Losing information about the state is most harmful in code that uses vector operations heavily but does not use partitioning (i.e., the control registers are given values that cause all elements of a vector to be modified and then many vector operations are performed). This is harmful because there are no/few opportunities for the information to be updated with precise information and because that loss of precision incurs an unnecessary cost.

To reduce this, synchronising circuitry 25 may be present in execution circuitry 20 and this transmits a synchronising signal back to issue circuitry 10 as required. This further path from the execution circuitry back to the issue circuitry is used to help resynchronise the two. Resynchronization has a cost because either the pipeline has to be stalled while resynchronization happens or it can only be performed when the pipeline is idle or, at least, stable (i.e. no operations are modifying the vector partition VP register).

This resynchronization can be performed periodically, in response to particular instructions and/or data values (e.g. when the data processing pipelines detect that the vector control registers had values which would have allowed optimization but that the optimization was not applied) or opportunistically (i.e. depending on the cost of resynchronisation).

Figure 2:
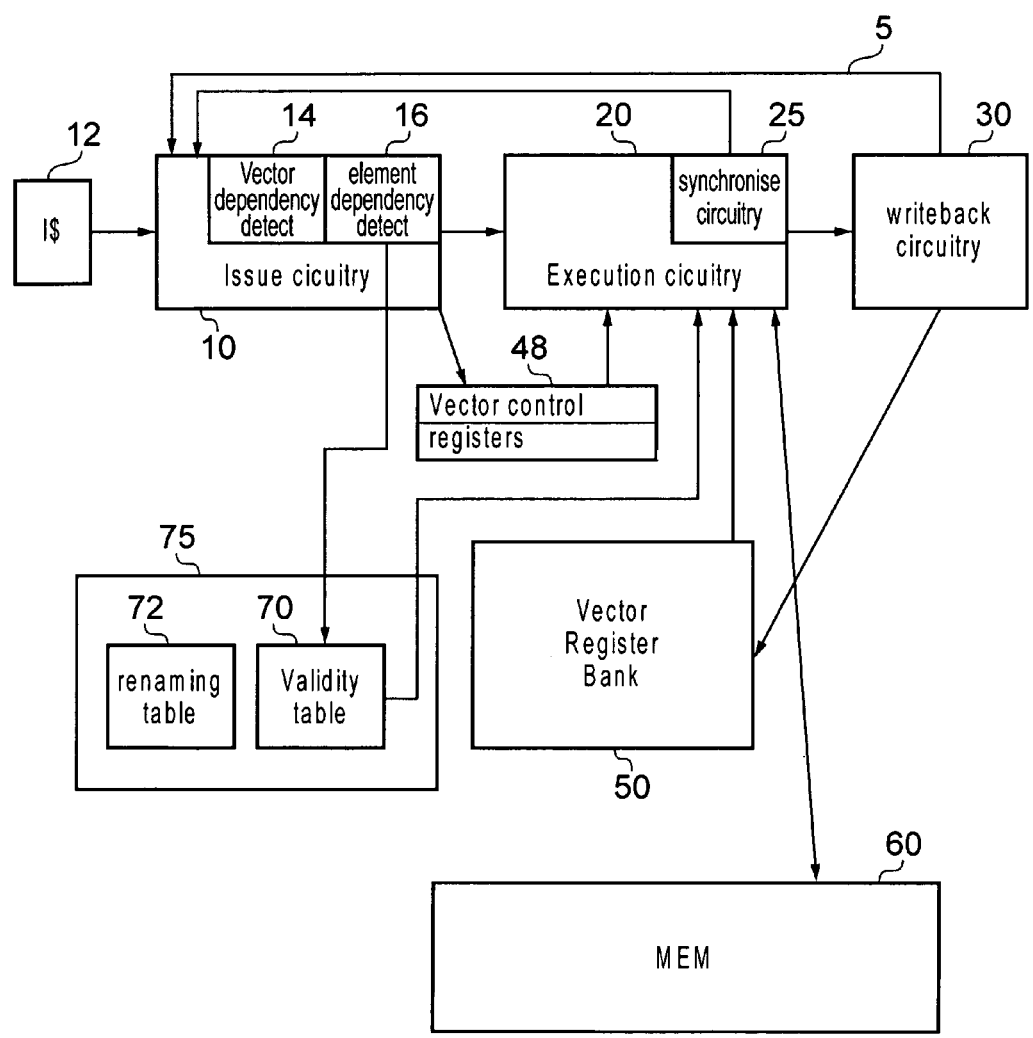
FIG. 2 schematically shows a data processing apparatus with register renaming circuitry according to an embodiment of the present invention.

FIG. 2 shows a further data processing apparatus that is similar to the data processing apparatus of FIG. 1 but additionally has register renaming circuitry 75. It should be noted that embodiments of the present invention can be used both for in-order and out-of-order processing. In this regard processing apparatus that are considered as in-order processors generally execute instructions in the order of the instruction stream. However they may allow overlapping and parallel execution of these instructions to increase speed of execution. Embodiments of the present invention can be used to improve such parallelism where data elements are accessed in vectors in such a way that potential data dependencies between the vectors do not actually arise.

Register renaming circuitry 75 may be present in an out-of-order processor and is used where the number of physical registers present in the register bank is greater than the number of registers that the instruction set can name. Thus, a particular register in the register bank is mapped by the register renaming circuitry 75 to a register specified in an instruction, the mapping is stored in renaming table 72. In this embodiment the register renaming circuitry also comprises the validity table 70 that stores information about which elements in a vector are undefined.

Figure 3:
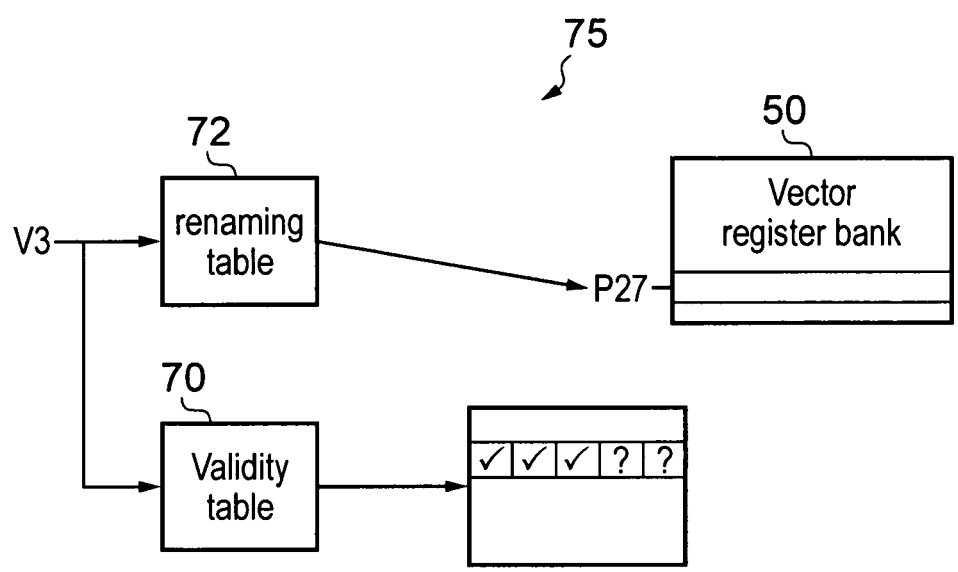
FIG. 3 schematically shows register renaming circuitry according to an embodiment of the present invention.

Register renaming circuitry 75 is shown in more detail in FIG. 3. It comprises a renaming table 72 which maps the instruction identifiers of currently used registers to their physical location in the register bank 50. In this embodiment register renaming circuitry 75 also contains the validity table 70 which indicates the validity of each of the data elements within a register. This is similar to the validity table of FIG. 1 but where there is register renaming circuitry it is convenient to store the validity information here as this is obtained at a similar time to that at which the register renaming occurs.

Embodiments of the present invention can substantially improve the efficiency of a data processing apparatus that uses renaming. Register renaming is very expensive during vector processing, as operations on data elements within a vector stored in a register, will generally require a new register to be renamed, and the data elements not operated on by this operation and stored in a previously renamed register merged with the newly renamed register. By recognising that subsequent data elements can be discarded this renaming and copying of data can be suppressed and substantial savings in power and time made. In effect if several operations are to update a particular register then it only needs to be renamed once, and subsequent vector operations can simply access the same register and update the elements that are recognised as being able to be discarded. Furthermore, in the case that a first element in a vector is accessed then renaming can be encouraged and a new register can be mapped for this new updating of the first element. This register is then used in the updating of further element and a previously mapped register will not be overwritten and this can improve the timing constraints if this previous register is being used in read operations.

Figure 4:
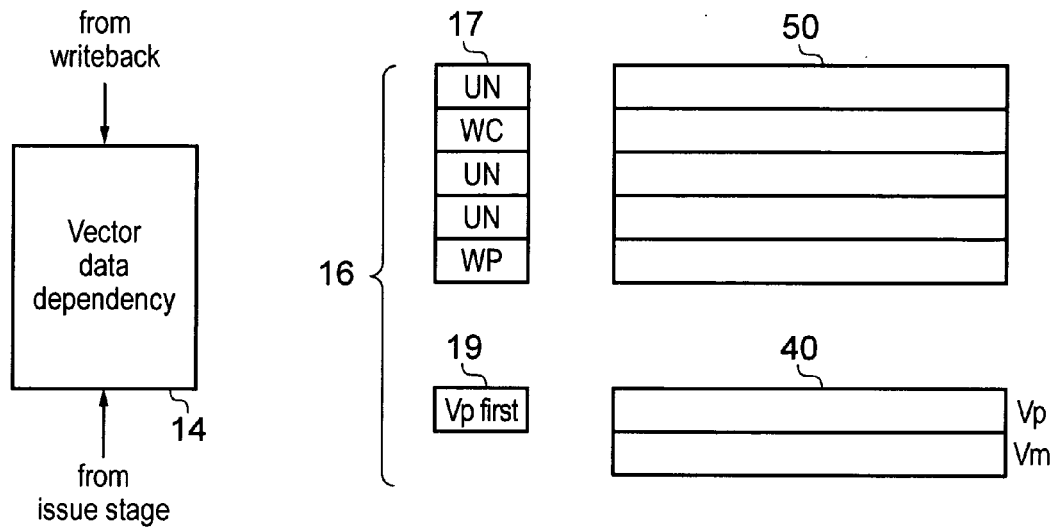
FIG. 4 schematically shows vector and data dependency detecting circuitry according to an embodiment of the present invention.

FIG. 4 shows the vector data dependency circuitry and the element dependency circuitry in more detail. The vector data dependency circuitry 14 receives information from the issue stage and from the writeback stage and determines from these vector data dependencies. These are then amended in the light of dependencies that are determined by the data element dependency circuitry 16, which in this embodiment is in the form of a state machine 17 which is associated with the vectors of the vector register bank 50 and a state machine 19 which is associated with the vector control registers 40. State machine 17 has in this embodiment three states, there is an unknown state UN, a write to current partition state WC and a write to previous partition state WP. These will be described in more detail with respect to FIG. 5.

In operation as a vector operation is analysed, the state machine is updated with the state relating to the current operation and this can be used to determine whether optimisations with respect to the determined vector data dependencies are possible or not. Thus, the value in the state machine will indicate which partitions relative to the current partition are being operated on and which store data that needs to be preserved and which store data that can be discarded. This information can be used to determine where timing constraints arising to avoid data hazards between vector operations are not required as these hazards will not occur when considering individual elements.

In this embodiment there is also a state machine 19 that is associated with the vector control registers 40. This can be used to track the first data element that is to be updated and can be used to determine where register renaming is appropriate and where not this will be described with respect to FIG. 6.

When using partitions with vectors, it is common to generate an initial partition P0, use that is used to compute some values in a vector register A, then use P0 to generate a successor partition P1 which does not overlap with P0 and is used to compute some further values which are then merged into vector register A, and continue generating further partitions which do not overlap with any earlier partition until enough elements have been processed.

Partitioning can be performed in a number of ways but one way is for a 'vector partition' register (VP) to hold a pair of element index values which identify the current partition. For example, if VP contains the pair [0,3], then element positions 0, 1, 2 and 3 are in the current partition. Two key operations used when partitioning are VPCLR (which 'clears' the VP register) and VPNXT (which changes VP to a next partition.

VPCLR sets the VP register to an initial partition containing no active elements [0,0] (this is just an example and an alternative design might set VP to [0,7]).

The VPNXT operation changes VP to identify the next partition which is the sequence of elements occurring after the current partition. For example, given an initial value of VP of [0,0], using VPNXT once might change VP to [0,2], using VPNXT a second time might change VP to [3,5], and using VPNXT a third time might change VP to [6,7]. As can be seen, partitions move from low-numbered elements through to higher numbered elements and the successive partitions generated by VPNXT do not overlap each other. (The exact number and sequence of partitions is often data dependent).

The value of the VP register affects the elements that other vector operations (such as VADD, VMUL, VLOAD, etc.) apply to: in that only active elements may be modified. In addition, values of lower-numbered elements are unmodified and values of higher-numbered elements are undefined in that they may be modified later and their values can be overwritten and do not need to be preserved.

An example of some code is given below.

```
VPCLR
; VP==[0..0]
VPNXT V5 ; use information in V5 to determine next partition
(0..2 used for illustration purposes)
; VP==[0..2]
VADD V0,V1,V2 ; add elements of V1[0..2] to V2[0..2], result in V0[0..2]
```

V0

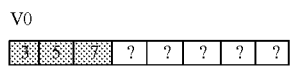

```
VPNXT V5 ; use information in V5 to determine next partition (3..5 used
for illustration purposes)
; VP==[3..5]
VSUB V0,V4,V6 ; subtract elements of V4[3..5] to V6[3..5], result in
V0[3..5], preserving V0[0..2]
```

V0

```
VPNXT V5 ; use information in V5 to determine next partition (6..7 used
for illustration purposes)
; VP==[6..7]
VADD V0,V8,V9 ; add elements of V8[6..7] to V9[6..7], result in V0[6..7]
```

V0

Two key things to observe in the above code example are:
1) Each vector operation writes to a different (non-overlapping) set of elements from the operation before. This property is independent of the location of the partitions, it will be true whenever one vector operation is performed, then VPNXT is used to move to the next partition and then another vector operation is performed. This observation means that although there is a RAW hazard at the register level, there is no RAW hazard at the element level.
2) The elements beyond the current partition are undefined (shown with ?) and cannot be relied upon to have any particular value by the program until after the next VPNXT and subsequent vector operation. This eliminates a false WAR hazard at the element level.

In consequence, a number of optimizations can be applied:
1) All three vector operations which write to V0 could, in principle, execute in parallel or in a different order since there is no actual hazard or dependency between them. All that is required is to merge the results into a single result register.
2) When executing operations involving the same destination register in parallel or out of order, it is normally necessary to use register renaming in order to support precise exceptions or to introduce stalls to handle WAW hazards. Since writes to early in the partition leave later elements undefined, use of register renaming or stalls is not necessary in this example: all operations can write to a single physical register.

Before describing how such optimizations can be implemented, we need to detect the potential for these optimizations. This can be done by monitoring the instruction stream using a state machine 17, such as is shown in FIG. 4 for example.

Figure 5:
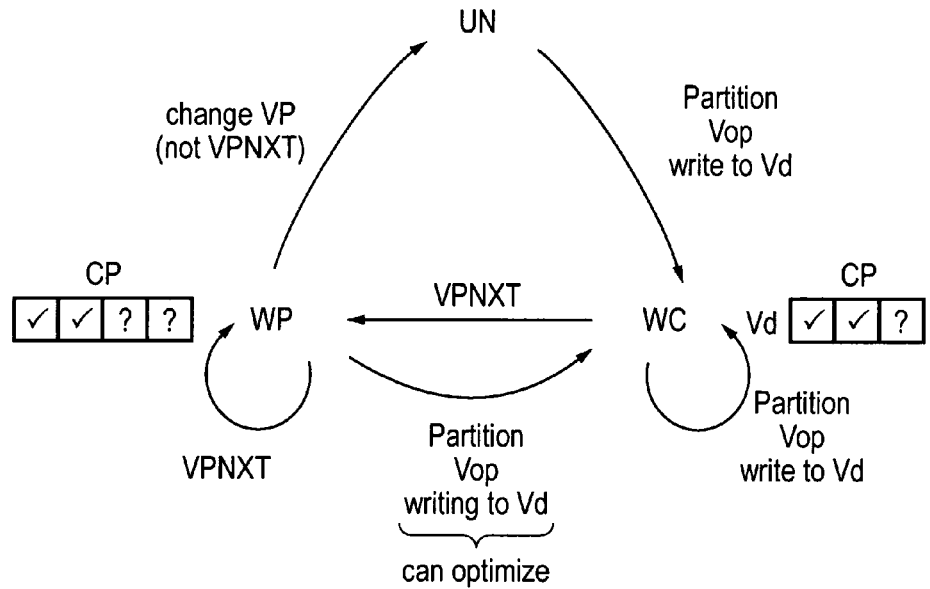
FIG. 5 schematically shows a state machine according to an embodiment of the present invention.

The states of such a state machine are shown in FIG. 5. These follow the detected states that a processor would have when processing code such as is shown above. Initially the processor is in the unknown state, in this state to be safe no optimisations can be applied. When a partitioned vector operation such as the VADD shown above is performed, then the destination register Vd is written to and the processor moves to a new "WC" state, that is the write to current partition state. In this state the values of the current partition and previous partitions should be preserved but later partitions are undefined and may be overwritten. Any further partitioned vector operation being performed will make the processor remain in this state, however, a VPNXT instruction will move the processor on to the next partition and before a partitioned vector operation is performed which will move the processor back to the WC state, the processor will be in the "WP" state which is the written by previous partition state in which all elements in the current partition and in subsequent partitions are undefined. This state can be optimised by combining with the previous write, as one is only overwriting undefined values and as such data hazards do not arise. Thus, recognition of this state is a trigger that optimisations can be performed.

When a new vector partition is received one switches to the unknown state.

In addition to this state machine a further state machine (19 in FIG. 4) may be helpful for some optimisations. This further state machine can be used to track the first data element that is to be updated and can be used to determine where register renaming is appropriate and where not. Thus, as can be seen from FIG. 6, the state starts as an unknown VPUN state. Receipt of a VPCLR operation moves the state to VPZERO where one is before the initial partition and no elements are active. A VPNXT moves the state to the first partition and this is important when determining if register renaming should be performed or not. In embodiments of the invention register renaming is implemented for a destination register when the state is identified as VPFIRST. Any subsequent operation on the same destination register identified by the state machine 50 and the WP state should have register renaming suppressed.

Any further operation changing the partition will take the state to unknown, and the VPFIRST state is only attained again in response to a VPCLR followed by a VPFIRST.

FIG. 7 shows an example sequence of code and the corresponding states of state machine 17 and 19 of FIG. 4. Thus, in this case, both state machines start in an unknown state, and state machine 19 moves to VPZERO state in response to the VPCLR instruction and the to VPFIRST in response to the VPNXT instruction, at this point the destination register is renamed using register renaming circuitry. State machine 17 stays in the unknown state until the vector operation VADD is performed on the first partition, whereupon it enters the write to current or WC state. At this point the state machine 19 enters the unknown state. In response to the VPNXTV5 instruction indicating the next partition, the stat machine 17 enters the WP state and the next operation can be optimised and performed in parallel with the previous operation, register renaming is suppressed for this operation so that it is written to the same destination register.

In summary embodiments of the present invention determine where there is no WAW element hazard (i.e., where the state machine on the destination register indicates that there is no WAW hazard, the WP state), and at this point it is safe to suppress allocation of a fresh physical register (register renaming) and to allow a new partitioned vector operation to write into the current physical register. This avoids having to repeatedly copy elements outside of the current partition from one physical register to another and the problem of serializing successive partitioned operations on the same register.

In addition to making changes in the decode and issue logic, this optimization requires a change in the vector register file: instead of writing to all elements of a vector register, an operation will only write to those elements in the current partition. To accomplish this, the vector register file may use a 'write select' signal for each element of a vector register so that it can choose only to write to elements 3, 4 and 5 (for example). This also requires that control signals selecting which elements to write must be propagated back to the writeback stage.

Where there is no RAW element hazard (i.e., where the state machine on the VP register indicates that the current partition includes the first element), it is necessary to allocate a fresh physical register (trigger register renaming) but it is not necessary to copy any elements from the previous physical register. This eliminates part of the problem of having additional dependencies between vector operations.

These optimizations affect the processes of allocating fresh physical registers, translating register names to physical registers and arranging to read the previous value of a register so they are best performed in the instruction decode and issue logic which performs these processes.

This technique does not eliminate all copying and all dependencies: sometimes the copying or dependencies are required and sometimes the technique is unable to detect that they are not required. When copying is required, it can be done in one of two ways.

One approach is for the execution logic to support two variants of a partitioned vector operation: one which performs merging and an optimized form that does not perform merging. The instruction issue logic can select the appropriate variant based on the values of the state machines.

An alternative approach is for the execution logic to support just one variant of a partitioned vector operation but to include an additional 'merge' operation which can merge elements of two vectors into a single vector. When the technique detects that there is no WAW hazard or that there is no RAW hazard, only the partitioned vector operation needs to be issued. In all other cases, the decode/issue logic needs to additionally issue this 'merge' operation to read the previous value of the register, merge it with the new result and write it back to the new physical register file.

Figure 8:
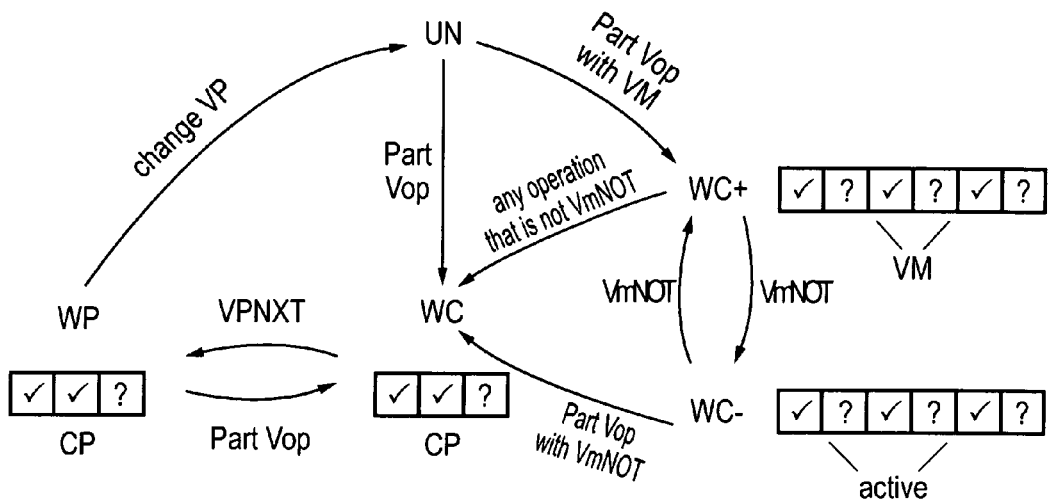
FIG. 8 schematically shows a state machine for code having both partitions and masks according to an embodiment of the present invention.

FIG. 8 shows how the state of a processor that has masks used with partitions. It may be that in addition to performing operations on particular partitions the processor does so under control of a mask that identifies elements within the partition that the operation should be performed on. For example, one might use a vector compare operation to set a vector mask, then use that mask to perform a vector add writing to vector register V0 then use the inverse of that mask to perform a vector subtract also writing to vector register V0. Depending on how masking is defined, this may merge the results of the vector add and subtract into a single vector. As with vector partitioning, vector masking involves certain common code sequences which can be monitored using simple state machines. In particular, when combined with vector partitioning, we can split the WC state (above) into several substates.

FIG. 8 shows the extension to the state machine of FIG. 5 that occurs when an additional two states WC+ and WC− arise due to the use of the masks. In this case a first operation is performed on the elements selected by the mask and this is the WC+ case where some of the elements of the current partition are undefined, a VMNOT operation may then be performed to select the other elements and these are then selected for an operation but before the operation is performed they are active (selected) but not yet defined (updated). Once the operation has been performed then the processor enters the WC state, and in response to a VPNXT the WP state that indicates that the next operation can be optimised by being performed in parallel with the previous one.

Figure 9:
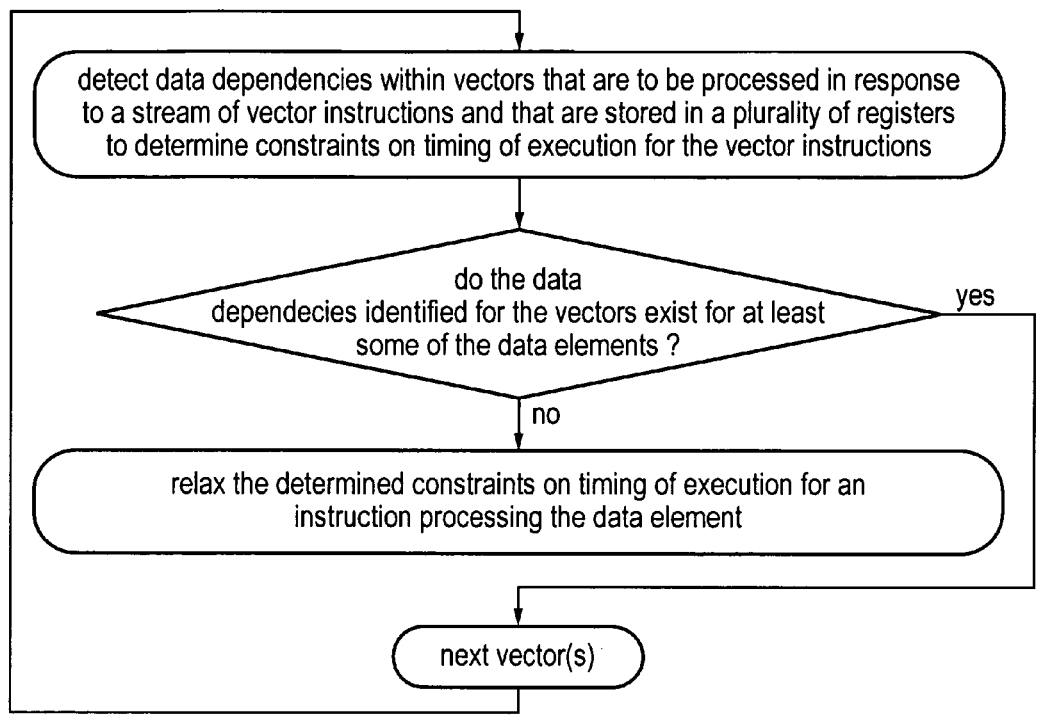
FIG. 9 shows a flow diagram illustrating steps in a method according to an embodiment of the present invention.

FIG. 9 show a flow diagram illustrating steps in a method according to an embodiment of the present invention. In this method data dependencies are detected within vectors that are to be processed by a stream of vector instructions and constraints on timing of execution of the vector instructions is determined. It is then determined if the data dependencies identified are present for the data elements and if not the timing constraints can be relaxed for the processing of these data elements. This method may be performed by a computer in response to a computer program, and it may be performed in a compiler that is compiling the stream of vector instructions. In this respect rather than determining the optimisations during processing of these instructions they are determined at compilation time. The compiler may be external to the system or it may be within a processing apparatus such as is shown in FIG. 10.

Figure 10:
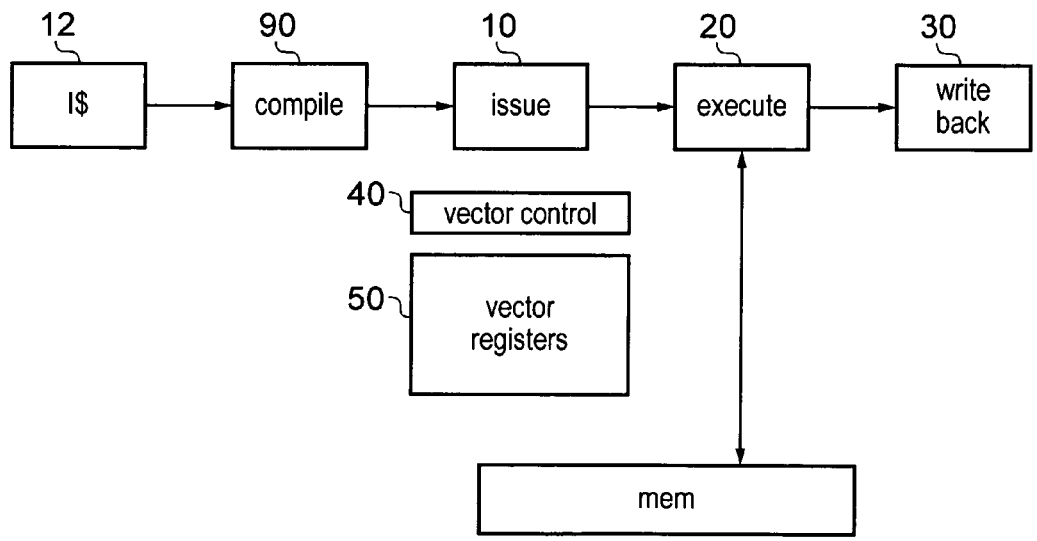
FIG. 10 shows a data processing apparatus with a compiler according to an embodiment of the present invention.

FIG. 10 shows a data processing apparatus where a runtime compiler 90 is used to compile the code received from instruction cache 12. The compiler analyses the code and determines the vector data dependencies and the associated constraints on timing of execution of instructions to ensure no data hazards. It then looks at individual data element data dependencies and determines where the timing constraints previously determined can be relaxed. The compiled code optimised in this way is then sent to issue stage 10 and proceeds through the pipeline. It should be noted that although the compiler is shown here as a runtime compiler it may be a remote compiler that is used to compile the code prior to processing it.

In summary embodiments of the invention enable optimizations based on identifying cases where hazards do not exist and suppressing behaviour when a hazard exists. In an out of order processor, superfluous register renaming is suppressed and, consequently, superfluous register reads. Furthermore, superfluous pipeline stalling is suppressed.

In a processor where vector operations are performed in a partially sequential manner (e.g., 2 elements at a time until all elements have been processed), multiple operations which write to the same vector are allowed to proceed in parallel.

Embodiments of the invention use a monitoring circuit in the instruction decoder which monitors the instruction stream looking for instructions which compute vector partitions and for instructions which are modified by vector partitions. This monitoring circuit uses a small, simple state machine to track the state of each vector register and the vector control registers to identify cases where optimizations are possible and safe and triggers the decode/issue logic to behave differently.

Out of order processors often use register renaming to eliminate false register dependencies and to support precise exceptions. Register renaming establishes a translation from register names used in instructions to physical register names. As each instruction is decoded and prepared for issue, unused physical registers are allocated to hold the result of the instruction and the input register names are translated to their current physical mapping. This works well for scalar instructions but it introduces two types of inefficiency when used for vector partitioned vector operations:

1. Since partitioned vector operations merge the previous value of the destination register with freshly calculated values for the current partition, it is necessary to read the previous value from the physical register previously mapped to this register. This requires an additional read port and, if vector operations have a partially sequential implementation, may take considerable time. This copying process is often repeated multiple times for each element: if a vector is partitioned into N separate partitions, then elements of the first partition will be copied N−1 times.
2. It creates an additional dependency between operations on the same register: even if they operate on disjoint sets of elements, a second operation cannot complete until after a first operation on the same register has produced its result. This serialization reduces the potential parallelism in a program using partitioned vector operations.

Our solution to these problems is to use the techniques described above to identify situations where there are no element hazards and use that to suppress each of these inefficiencies.

Pipelined in-order processors try to overlap execution of independent instructions and rely on hazard detection logic (aka interlocks) to detect dependent instructions and stall issue of the second dependent instruction until the result of the first instruction is available.

As described above, partitioned vector operations often suffer from register hazards which, without the present technique, cause instruction issue to stall. Adding the technique to a pipelined in-order processor allows the hazard detection logic to identify situations where there is no element hazard and thus avoid introducing unnecessary stalls.

As with out-of-order processors, the additional requirement is to modify the vector register file with write select signals to control which elements are written and to arrange to propagate signals from the VP register back to the writeback stage.

FIG. 11 shows example instructions that are annotated to indicate that data dependencies between the different instructions do not exist. This example shows the first two and last two instructions of eight instructions each annotated with '_first', '_partial' and '_last' to indicate the absence of some data dependencies that would exist in their unannotated variants. Their unannotated variants would set element number 0 of vector register V0 to the contents of scalar register R0, element number 1 of V0 to the contents of scalar register R1, . . . and element number 7 of V0 to the contents of scalar register R7. Their unannotated variants would also lead to write-after-write (WAW) hazards that would cause the instructions to execute sequentially.

The annotated variants also set corresponding element numbers to the contents of scalar registers but indicate that these instructions do not create data element hazards and so the instructions can execute in parallel or out of order.

In a processor that uses register renaming:
the Vset_first instruction causes allocation of a fresh physical register P mapped to vector register V0 but indicates that the contents of the physical register previously mapped to V0 need not be copied into P.

the Vset_partial instruction updates the appropriate element of the physical register P mapped to V0 (it does not require allocation of a fresh physical register, and merging the previous contents of the register with the new element value)

the Vset_last instruction updates the final element of the physical register P mapped to V0 (again, it does not require allocation of a fresh physical register or merging of old values) and indicates that the register has now been fully updated.

In an in-order processor, the Vset_first instruction must execute after previous instructions using V0 and the Vset_last instruction must execute before subsequent instructions using V0 but the Vset_partial instructions can execute in parallel with any of the Vset_first, other Vset_partial and Vset_last instructions in this sequence.

It will be recognized that the '_first' annotation is used when setting element number 0, the '_partial' annotation is used for elements 1 through 6 which are neither the lowest nor the highest numbered element in a vector and the '_last' annotation is used for element 7. This would allow en efficient instruction encoding whether the difference between _first, _partial and _final is determined by the element number.

Various further aspects and features of the present invention are defined in the appended claims. Various modifications can be made to the embodiments herein before described without departing from the scope of the present invention.

The invention claimed is:

1. A data processing apparatus for processing a stream of vector instructions for performing operations on vectors, said vectors each comprising a plurality of data elements, said data processing apparatus comprising:
a register bank comprising a plurality of registers for storing said vectors being processed;
a pipelined processor for processing said stream of vector instructions;
said pipelined processor comprising circuitry configured to detect data dependencies for said vectors processed by said stream of vector instructions and stored in said plurality of registers and to determine constraints on timing of execution for said vector instructions such that no register data hazards arise, said register data hazards arising where two accesses to a same register, at least one of said accesses being a write, occur in an order different to an order of said instruction stream such that an access occurring later in said instruction stream starts before an access occurring earlier in said instruction stream has completed;
said pipelined processor comprising data element hazard determination circuitry configured to determine for at least some of said data elements within vectors where data dependencies have been identified, whether said data dependencies identified for said vectors exist for each of said at least some of said data elements, and if not to relax said determined constraints on timing of execution for an instruction processing said data element.

2. A data processing apparatus according to claim 1, wherein said data processing apparatus is configured to access data elements within a vector in a predetermined accessing order and said data element hazard determination circuitry is configured to determine, that when at least one data element is to be updated within a vector in response to a vector instruction subsequent data elements in said predetermined accessing order within said vector currently contain values that may be modified and can be discarded, and to signal to execution circuitry that at least one operation in response to at least one further vector instruction to update at least one of said subsequent data elements can be performed in any order with respect to said operation to update said data element.

3. A data processing apparatus according to claim 2, wherein said vector is divided into partitions, each partition comprising at least one data element, where partitions comprise multiple data elements said multiple data elements are neighbouring data elements, said data processing apparatus being configured to access said partitions within a vector in a predetermined accessing order.

4. A data processing apparatus according claim 1, wherein said data element hazard determining circuitry comprises a state machine, said state machine indicating a state of values stored by data elements within a vector as said vector is accessed by an instruction, said state indicating whether said data elements are storing data values that are to be preserved or data values that can be discarded.

5. A data processing apparatus according to claim 3, wherein
said data element hazard determining circuitry comprises a state machine, said state machine indicating a state of values stored by data elements within a vector as said vector is accessed by an instruction, said state indicating whether said data elements are storing data values that are to be preserved or data values that can be discarded; and
said state machine comprises three states, an unknown state which indicates that all data elements comprise data values that are to be preserved, an access current state indicating that all data elements subsequent to said current partition currently being accessed by said vector instruction can be discarded and all other data elements are to be preserved, and an accessed by previous partition state that indicates that all data elements within said current partition and all subsequent data elements can be discarded and all previous data elements have data values that are to be preserved.

6. A data processing apparatus according to claim 5, wherein said data processing apparatus comprises a plurality of vector control registers for controlling which of said partitions said instruction is to operate on and a store for storing a value indicating which one of said plurality of vector control registers is indicating a current partition, wherein in response to detecting from said stored value that one of said vector control registers that indicates a next partition is different to said vector control register that indicated said previous partition, said state machine is switched to an unknown state.

7. A data processing apparatus according to claim 5, wherein said accessed by previous partition state indicates to said data element hazard determining circuitry that said vector operation on said current partition and said vector operation on a previous partition can be performed in any order.

8. A data processing apparatus according to claim 1, wherein said circuitry configured to detect data dependencies for said vectors processed by said stream of vector instructions is responsive to annotations associated with said vector instructions indicating no data dependencies when determining said data dependencies.

9. A data processing apparatus according to claim 2, wherein said data processing apparatus further comprises register renaming circuitry for mapping registers identified by register identifiers within said vector instruction with one of said plurality of registers within said register bank; wherein
in response to said data element hazard determination circuitry determining that at least one data element is to be updated within a vector in response to a vector instruction and that subsequent data elements in said predetermined accessing order within said vector currently contain values that may be modified and can be discarded, said pipelined processor is configured to update said register currently mapped to said register identified by said register identifier within said vector instruction.

10. A data processing apparatus according to claim 9, wherein
said pipelined processor comprises additional circuitry for determining when a first data element of a vector in an order of access is to be updated and for transmitting a signal indicating that said vector can be written to any currently unused register.

11. A data processing apparatus according to claim 10, wherein said additional circuitry comprises a first element state machine having a first state indicating an unknown state and at least one further state indicating a first element of said vector to be accessed is to be updated.

12. A data processing apparatus according to claim 1, said data processing apparatus further comprising a data store for storing indicators that provide an indication for each data element within a vector indicating whether said data element is currently storing a data value that should be preserved or a data value that can be discarded, said element data hazard determination circuitry being configured to update said indicator store.

13. A data processing apparatus according to claim 12, said data processing apparatus being configured in response to an instruction that reads a vector register element to store a predetermined value in place of a value currently stored in said data element for each data element within a partition that is marked as storing a data value that can be discarded.

14. A data processing apparatus according to claim 1, wherein said pipelined processor comprises issue circuitry and execution circuitry for issuing and executing said vector instructions, said issue circuitry comprising said data element hazard detection circuitry.

15. A data processing apparatus according to claim 14, said data processing apparatus comprises synchronising circuitry, said synchronising circuitry being configured to periodically determine a state of data elements currently being processed by said execution circuitry and to transmit said state information to said issue circuitry.

16. A data processing apparatus according to claim 1, wherein said vectors comprise vector masks configured to identify data elements to be operated on by a vector operation, said data element hazard determination circuitry being configured to determine from said vector masks whether said data dependencies identified for said vectors exist for each of said at least some of said data elements, and if not to relax said determined constraints on timing of execution for an instruction processing said data element.

17. A data processing apparatus according to claim 5, wherein said vectors have vector masks associated with them configured to identify data elements within vector partitions to be operated on by a vector operation, said data processing apparatus being configured to perform one operation on a vector partition under control of a vector mask and a further operation on said vector partition under control of an inverse of said vector mask, said state machine comprising at least one further state comprising a masked access current state indicating that all data elements subsequent to said current partition currently being accessed by said vector instruction and said masked data elements within said data partition can be discarded, and all other data elements are to be preserved.

18. A method of processing a stream of vector instructions for performing operations on vectors within a data processing apparatus, said vectors each comprising a plurality of data elements and being stored in registers within said data processing apparatus, said method comprising:
  detecting data dependencies for said vectors processed by said stream of vector instructions and stored in said plurality of registers to determine constraints on timing of execution for said vector instructions such that no register data hazards arise, said register data hazards arising where two accesses to a same register, at least one of said accesses being a write, occur in an order different to an order of said instruction stream such that an access occurring later in said instruction stream starts before an access occurring earlier in said instruction stream has completed;
  determining for at least some of said data elements within vectors where data dependencies have been identified, whether said data dependencies identified for said vectors exist for each of said at least some of said data elements, and if not:
  relaxing said determined constraints on timing of execution for an instruction processing said data element.

19. A method according to claim 18, wherein said data processing apparatus is configured to access data elements within a vector in a predetermined accessing order, and said step of relaxing said determined constraints on timing of execution comprises:
  determining when at least one data element is to be updated within a vector in response to a vector instruction that subsequent data elements in said predetermined accessing order within said vector currently contain values that may be modified and can be discarded; and
  signalling to execution circuitry that at least one operation in response to at least one further vector instruction to update at least one of said subsequent data elements can be performed in any order with respect to said operation to update said data element.

20. A method of transforming a computer program, said computer program comprising a plurality of vector instructions for performing operations on vectors, said vectors each comprising a plurality of data elements, said method of compiling comprising:
  analysing said plurality of vector instructions;
  detecting data dependencies for said vectors to be processed by said plurality of vector instructions to determine constraints on timing of execution for said vector instructions such that no register data hazards arise, said register data hazards arising where two accesses to a same register, at least one of said accesses being a write, occur in an order different to an order of said instruction stream such that an access occurring later in said instruction stream starts before an access occurring earlier in said instruction stream has completed;
  determining for at least some of said data elements within said vectors where data dependencies have been identified, whether said data dependencies identified for said vectors exist for each of said at least some of said data elements, and if not:
  relaxing said determined constraints on timing of execution for an instruction processing said data element;
  transforming said computer program into code suitable for execution on a data processing system.

21. A computer program which when executed on a computer will control said computer to perform steps of a method according to claim 20.

* * * * *